Patented Dec. 5, 1933

1,938,057

UNITED STATES PATENT OFFICE 1,938,057

PROCESS FOR THE PRODUCTION OF ALKALI PHOSPHATES

Conway, Baron von Girsewald and Hans Weidmann, Frankfort-on-the-Main, Germany, assignors to American Lurgi Corporation, New York, N. Y., a corporation of New York No Drawing. Application May 14, 1932, Serial No. 611,434, and in Germany December 17, 1931

4 Claims. (Cl. 23—106)

This invention relates to a process for the production of alkali phosphates.

According to our prior specification, U. S. Patent No. 1,891,293 the production of alkali phosphates is effected by heating a mixture of a metal-phosphorus compound, especially ferro-phosphorus, with an alkali carbonate, in presence of oxygen (e. g. in the form of air) at an elevated temperature, such as above 600° C., the mixture being preferably kept in movement—for example by continuously passing the charge material, together with the gases (composed, in part at least, of oxygen) necessary for oxidation through a rotary-tube furnace—care being taken to prevent, during the conversion process, increases of temperature at which the charge can melt and cake together.

We have now observed that, in certain cases, the mass has sintered and caked, although the temperatures did not attain the melting point of the sodium carbonate or that of the resulting alkali phosphate. It has hitherto been assumed that the reaction proceeds in accordance with the equations:—

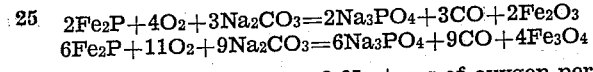

that is to say, with 4 or 3.65 atoms of oxygen per atom of phosphorus.

If the amount of oxygen (e. g. in the form of air) employed be merely sufficient for the complete combustion of the fuel in order to heat the reaction mixture to reaction temperature, together with the amount of auxiliary air corresponding to the oxygen of the above equations, working difficulties arise, even when further amounts of auxiliary air are admitted, in view of the fact that not all the particles of oxygen come into contact with the reaction mixture.

These difficulties consist in that owing to lack of oxygen part of the phosphorus is oxidized only to the stage of $P_2O_3$, and not to $P_2O_5$, whilst part of the iron is converted into FeO, instead of $Fe_2O_3$ or $Fe_3O_4$ or mixtures of these two oxides. The presence of ferrous oxide and of salts of phosphorus acid causes the mixture to sinter and cake so that not only is an inferior grade of tri-alkali phosphate obtained, but moreover, a considerable portion of the charge is prevented, as a result of the caking, from taking part in the reaction.

It has now been ascertained in accordance with the present invention that in order to ensure that the reaction proceeds smoothly to completion, it is theoretically necessary that the amount of oxygen present should be at least sufficient to convert the whole of the liberated carbon monoxide into carbon dioxide. This minimum theoretical content of oxygen can be expressed by the following equations:—

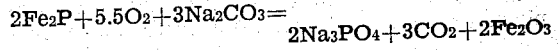
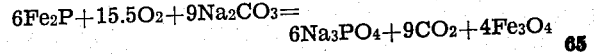

that is to say, there should be 5.5 or 5.17 atoms of oxygen to each atom of phosphorus.

However, since as already mentioned, not every molecule of oxygen has the opportunity of coming into contact with the mixture, experiments have shown that satisfactory progress of the reaction occurs only when the oxygen is present in excess, to such an extent that the exhaust gases contain at least 5% of free oxygen, and preferably not less than 9% or even more.

In order to enable the oxidation to be regulated as uniformly as possible throughout the entire mass of the reaction mixture, it is advisable that the oxygen, or gas (such as air) containing same, should be admitted, not merely at a single point, but at a number of points, suitably distributed in relation to the reaction chamber, for example over the whole length of the rotary tube employed, or over merely a portion of same. It is also advisable to provide for the possibility of controlling the volume of gas admitted at each point, for example by arranging suitable regulating devices in each of the supply pipes.

Temperatures between 600° and 950° C., for example, have been found suitable for the herein described conversion, but the invention is not limited to this temperature range. On the contrary, lower or higher temperatures may be employed according to the other working conditions, with the sole proviso that the limit at which partial or complete liquefaction, obstructing the access of oxygen to the mass, occurs be not reached.

*Example*

A mixture containing 110 parts by weight of calcined sodium carbonate per 100 parts by weight of a finely ground ferro-phosphorus (containing 20% of phosphorus) was passed through a rotary tube furnace, heated by a blast flame in the usual manner, care being taken by regulating the flames to maintain the temperature at about 800–900° C. after the reaction commenced. The reaction product was leached with water. The following yields of trisodium phosphate were obtained on leaching, by regulating the volume of air admitted—with a constant rate of travel of the reaction mixture through the tube—whilst the exhaust gases contained the proportions of free oxygen set forth in the appended table:—

| Oxygen (vol. %) in exhaust gases | Yield of trisodium phosphate in % of the theoretical. |
|---|---|
| 4 | 72 |
| 5 | 76-77 |
| 6 | 85 |
| 10 | 92 |
| 11-12 | 94 |

We claim:

1. Process for the production of alkali phosphates which comprises heating a metal phosphorus compound with a basic alkali metal compound to a reaction temperature below the fusion temperature of the reaction mixture while moving the mixture in contact with a current of oxygen-containing gas in such an amount that the issuing gas still contains at least 5% of oxygen.

2. Process for the production of trialkali phosphate which comprises heating ferro-phosphorus with a basic alkali metal compound to a reaction temperature below the fusion temperature of the reaction mixture while moving the mixture in contact with a current of oxygen-containing gas in such an amount that the issuing gas still contains at least 5% of oxygen.

3. Process for the production of alkali phosphates which comprises heating a metal phosphorous compound with a basic alkali metal compound to a reaction temperature below the fusion temperature of the reaction mixture while moving the mixture in contact with a current of air in such an amount that the issuing gas still contains at least 5% of oxygen.

4. Process for the production of trialkali phosphate which comprises heating ferro-phosphorus with a basic alkali metal compound to a reaction temperature below the fusion temperature of the reaction mixture while moving the reaction mixture in progressively revolving motion in a rotary tube furnace by blowing in a stream of gas consisting at least partly of oxygen in such an amount that the issuing gas still contains at least 5% of oxygen.

CONWAY, BARON VON GIRSEWALD.
HANS WEIDMANN.